United States Patent
Ito

(10) Patent No.: US 6,844,519 B2
(45) Date of Patent: Jan. 18, 2005

(54) ELECTRIC SPARKING DRILL AND METHOD FOR FORMING A HOLE WITH AN ELECTRIC SPARK

(75) Inventor: Tetsuro Ito, Palatine, IL (US)

(73) Assignees: MC Machinery Systems, Inc., Wood Dale, IL (US); Mikuni Makino Industrial Co., Ltd., Kanagawa (JP)

( * ) Notice: Subject to any disclaimer, the term of this patent is extended or adjusted under 35 U.S.C. 154(b) by 16 days.

(21) Appl. No.: 10/096,594

(22) Filed: Mar. 14, 2002

(65) Prior Publication Data

US 2003/0173337 A1 Sep. 18, 2003

(51) Int. Cl.[7] .............................. B23H 7/18; B23H 7/20
(52) U.S. Cl. .............................. 219/69.16; 219/69.13; 219/69.14
(58) Field of Search .......................... 219/69.14, 69.15, 219/69.16, 69.2, 69.13

(56) References Cited

U.S. PATENT DOCUMENTS 3,417,006 A * 12/1968 Inoue
4,767,903 A * 8/1988 Sciaroni

FOREIGN PATENT DOCUMENTS

| JP | 54-34197 A | * | 3/1979 | .............. 219/69.14 |
| JP | 61-111843 A | * | 5/1986 | |
| JP | 62-181826 A | * | 8/1987 | |
| JP | 4-283022 A | * | 10/1992 | |

* cited by examiner

Primary Examiner—Geoffrey S. Evans
(74) Attorney, Agent, or Firm—Harness, Dickey & Pierce, PLC

(57) ABSTRACT

An electric sparking drill and a method for using the same to drill a hole in a workpiece where at least one of a voltage applied to an electrode, the conductivity of a liquid applied between the electrode and the workpiece during drilling, and a gap between the electrode and the workpiece are controlled to create the desired hole in the workpiece. The electric sparking drill and a method for using the same to drill a hole in a workpiece also improve the hole operation and/or the quality of the hole made by operating at the arcing voltage, including a touch stop function, including a sacrificial electrode, and/or including a guide member function.

28 Claims, 15 Drawing Sheets

Remain stock

ELECTRIC SPARKING DRILL AND METHOD FOR FORMING A HOLE WITH AN ELECTRIC SPARK

BACKGROUND OF THE INVENTION

1. Field of the Invention

The present invention is directed to electrical discharge machines (EDMs) and more particularly, to an electrical sparking drill and a method for forming a hole with an electric spark.

2. Description of the Related Art

There are at least two types of EDMs for using an electrode to form a hole in a workpiece; wire cut machines and sparking drill machines. Within the sparking drill machine category, a liquid may be utilized between the electrode and the workpiece. In some conventional sparking drills, oil or kerosene is utilized as the liquid. However, these systems have a high probability of catching fire due to the combustibility of oil and/or kerosene in the presence of the electric spark.

A second type of sparking drill utilizes water as the liquid. Such conventional sparking drills utilize a high voltage, namely on the order of five times the arcing voltage, and high resistivity, on the order of 100,000–1,000,000 cmΩ. However, the high voltage applied wears down the electrode and often wears down the electrode unevenly, both of which are undesirable.

FIG. 1 illustrates a conventional electric sparking drill for drilling one or more holes in a workpiece 10 utilizing an electrode 12. A voltage vg is applied across the electrode 12 and a base 14, supporting the workpiece 10. The applied voltage vg, the gap 16', and the resistivity of the liquid 18 supplied from tank 20 determine whether arcing occurs between the electrode 12 and the workpiece 10 in order to machine a hole in the workpiece 10. The combination of parameters including at least the voltage of vg, the gap 16', and the resistivity of the liquid 18 may result in a desirable arcing condition or two undesirable conditions, an open circuit or a short circuit. The liquid 18 is pumped via pump 22 into the gaps 16 and 16'. Ideally, arcing only occurs at the end of the electrode 12 at gap 16', in order to efficiently machine the hole in workpiece 10. Arcing on the sides of the electrode 12 at gap 16 is undesirable and degrades the efficiency and speed with which the workpiece 10 may be machined. Typically, in prior art systems, the liquid 18 is de-ionized or pure water with a high resistivity in the range of 100,000–1,000,000 cmΩ. The pump 22 conventionally supplies the liquid 18 at a pressure of approximately 50 bars and at a flow rate of 60–100 cc/min. The voltage vg is supplied using a DC current source 24, a switching element 26, a current limiting resistor 28, a pulse generator 30, amplifiers 32 and 34, a mean voltage controller 36, a reference voltage $V_r$ and a feedback voltage $V_f$. Conventionally, the DC source 24 supplies a voltage on the order of four to six times the arcing voltage $V_a$.

The pump 22 supplies the liquid 18 via a high pressure joint 23. The amplifier 34 supplies a voltage to the motor Mz. The motor Mz controls the position of the electrode 12 in the z axis as illustrated in FIG. 1. The motor Mc controls the speed at which the electrode 12 revolves. The feedback voltage $V_f$ is supplied via a brush contact 38.

When the voltage across the gap $V_g$ reaches a predetermined level, an electric sparking drill or arc is formed across the gap 16'. As a result, the arc passes from the electrode 12 and terminates on the workpiece 10, creating a high temperature explosion at the workpiece 10, thus causing the workpiece 10 surface to decompose. Typically, the surface is melted and dispersed as resolidified chips that are retained in the gap 16'. Due to a pumping action of the electrode 12 caused by a periodic up-and—down "jump" of the electrode 12, the liquid 18 washes most of the chips out of the gap 16'.

FIG. 2 illustrates the operation of the conventional electric sparking drill illustrated in FIG. 1. The peak voltage $V_p$ is essentially equal to the open voltage, that is the voltage necessary to create an open circuit at the gap 16'. The width of the pulses of the peak voltage is controlled in order to supply a consistent mean voltage $V_m$. The arc voltage $V_a$ is the voltage at which a spark occurs at the gap 16' and the electrode 12 can machine a portion of the workpiece 10 in order to create the desired hole.

FIG. 3 illustrates the electrode 12 and the gaps 16 and 16' in more detail. As more clearly illustrated in FIG. 3, the liquid 18 travels through a center canal 13 of the electrode 12. The electrode 12, with a voltage applied thereto, and the liquid 18 interact at the gap 16' to create an arc to form a hole in the workpiece 10. However, if the conductivity, voltage, and gap size are not correctly selected, arcing can also occur at gap 16, which is undesirable. Arcing at the gap 16 causes the electrode 12 to wear, possibly unevenly. Further, as illustrated in FIG. 3, a high open voltage on the order of four to six times the arcing voltage wears the tip of the electrode 12 down, which causes the formation of remaining stock areas 11, caused by electrode 12 wear.

Further, once the electrode 12 goes entirely through the workpiece 10 and makes a hole on the other side, it is impossible to keep the liquid 18 at the gap 16'. Because the hole prevents the liquid 18 from being held in the gap 16', the spark must be made in air, which makes it very difficult to remove the remaining stock areas 11 and very difficult to keep the electrode 12 moving at high speed.

FIG. 4 illustrates a conventional relationship between the gap 16' and the arcing voltage $V_a$ for peak voltages equal to two, three, four and five times the arcing voltage $V_a$, respectively. A typical arcing voltage $V_a$ is 17–20 volts. The curves of the graph of FIG. 4 essentially illustrate the mean voltage applied at the gap 16'. As illustrated in FIGS. 1 and 2, the mean voltage controller 36 is utilized to control the mean voltage applied at the gap 16'. As seen in FIG. 4, voltages near the arcing voltage $V_a$, shown as the area 40, result in conditions which are extremely difficult to control.

FIG. 5 illustrates the difficult to control area 40 in more detail. FIG. 5 illustrates a curve of the working speed W of the electrode 12 and the current Ig as a function of the mean voltage and the gap distance for the arrangement in FIG. 1, where a high voltage is utilized as applied by DC source 24. As is clearly illustrated by the steepness of the W curve near $V_a$ in FIG. 5, it is extremely difficult, if not impossible, to control the arrangement illustrated in FIG. 1 at a voltage of approximately the arcing voltage, $V_a$. Due to the steepness of the curve W, it is difficult to determine whether an arcing, open, or short condition exists at the gap 16' at the arcing voltage $V_a$. As a result, in conventional systems, such as the one illustrated in FIG. 1, a higher voltage is utilized, closer to $V_p$, such as $2V_a$, $3V_a$, $4V_a$, or $5V_a$ is used.

As described above, in an electric sparking drill operation, the electrode 12 confronts the workpiece 10 to be machined with a gap 16' therebetween, and an electric discharge is caused in the gap 16' while a drilling solution, liquid 18, is supplied to the gap 16', to machine the workpiece 10 as required. If the electric sparking drill apparatus is used to bore a hole in the workpiece 10, a trimming die having a desired configuration can be formed with high accuracy.

As a result, this operation is useful for forming various metal or other molds. However, conventional systems, such as the one illustrated in FIG. 1, have several other deficiencies. First, conventional methods of forming a hole in a workpiece 10 using an electric sparking drill cannot automatically detect the time instant when the end of the electrode 12 penetrates the workpiece 10. Heretofore, in order to detect the penetration of the electrode 12, the amount of feed of the electrode 12 was estimated or an operator was required to watch the movement of the electrode 12, during the drilling operation.

Accordingly, although the hole has been formed in the workpiece 10, the electrode 12 is still supplied with current to continue the electric sparking drill machining operation. As a result, the nominal drilling time is increased, and the side of the trimming die is excessively machined i.e., drilling accuracy is considerably lowered. As described above, in order to detect when the electrode has penetrated the workpiece to thereby end the drilling operation, the operator must carry out troublesome work, which lowers work efficiency and makes it difficult to provide an automatic electric sparking drill.

Prior art electric sparking drill apparatus are further disadvantageous in that, in the case where a through-hole is formed in the workpiece 10 with an electrode 12 which is a fine electrode tube, the electrode tube vibrates depending on the amount of feed of the electrode 12 after the electrode 12 has penetrated the workpiece 10; that is, the electrode tube does not move in a straight line after penetrating the workpiece 10, and as a result, the configuration of the hole thus formed is adversely affected.

Conventional electric sparking drill apparatus are further disadvantageous in that the electrode 12 and the workpiece 10 are usually of opposite polarity. Typically, the electrode 12 is strongly negative and workpiece 10 is strongly positive, which results in the migration of ions from the workpiece 10 to the electrode 12. This erosion has a negative effect on the workpiece 10.

Prior art electric sparking drill apparatus are further disadvantageous in that the electrode 12 is usually very fine, with a very small inner and outer diameter, and is therefore easily damaged or deformed. Using a damaged or deformed electrode 12 results in a poor quality hole in the workpiece 10.

SUMMARY OF THE INVENTION

The present invention is directed to several embodiments of an electric sparking drill and a method for using the same to drill a hole in a workpiece wherein, at least one of a voltage applied to the electrode, the resistivity of a liquid applied between the electrode and the workpiece during drilling, and the gap between the electrode and the workpiece are controlled to create the desired hole in the workpiece.

In another exemplary embodiment of the present invention, for a given drill, the arcing voltage is a function of the voltage applied to the electrode, resistivity of the liquid between the electrode and the workpiece, and the gap between the electrode and the workpiece. In at least one exemplary embodiment of the present invention, the voltage applied to the electrode is in the range of approximately equal to the arcing voltage to twice the arcing voltage.

In another exemplary embodiment of the present invention, the voltage applied to the electrode is a mean voltage. In yet another exemplary embodiment of the present invention, the mean voltage is approximately 0.5 to 0.8 of the arcing voltage.

In yet another exemplary embodiment of the present invention the liquid is a high resistivity liquid. In yet another exemplary embodiment of the present invention, the high resistivity liquid has a resistivity of 6,000–10,000 cmΩ.

The present invention, in yet another exemplary embodiment, is directed to an electric sparking drill and method of drilling a desired hole, wherein a servo is utilized to measure the voltage applied to the electrode and control the gap between the electrode and the workpiece accordingly.

The present invention, in yet another exemplary embodiment, is directed to an electric sparking drill and a method for drilling a hole in a workpiece, wherein a controller is utilized to control the voltage applied to the electrode depending on the resistivity of the liquid provided between the electrode and the workpiece.

The present invention, in yet another exemplary embodiment, is directed to an electric sparking drill and a method of drilling a hole, wherein a controller is utilized to measure the resistivity of the liquid provided between the electrode and the workpiece and the conductivity of the liquid is increased or decreased depending on the measurement to maintain proper arcing at the gap.

The present invention, in yet another exemplary embodiment, is directed to an electric sparking drill and method for drilling a hole utilizing a touch stop feature such that when the electrode completely drills through the workpiece, the electrode contacts an element, such as a touch plate, to complete a circuit. When the circuit is completed by the electrode touching the element, such as the touch plate, a signal is generated to stop the penetration of the electrode.

The present invention, in yet another exemplary embodiment, is directed to an electric sparking drill and a method for drilling a hole, which utilizes a sacrificial electrode, in order to reduce the migration of ions from the workpiece to the electrode. Instead, ions migrate from the sacrificial electrode to the electrode.

The present invention, in yet another exemplary embodiment, is directed to an electric sparking drill an invention for drilling a hole, which utilizes an element, such as a guide member, in order to detect eccentricities in the revolutions of the electrode. If the electrode revolves eccentrically, the electrode touches the guide member, which completes the circuit which sends a signal to stop the motor controlling the electrode.

The exemplary embodiments of the present invention will be described with reference to the accompanying drawings.

DETAILED DESCRIPTION OF THE PREFERRED EMBODIMENTS

Figure 1:
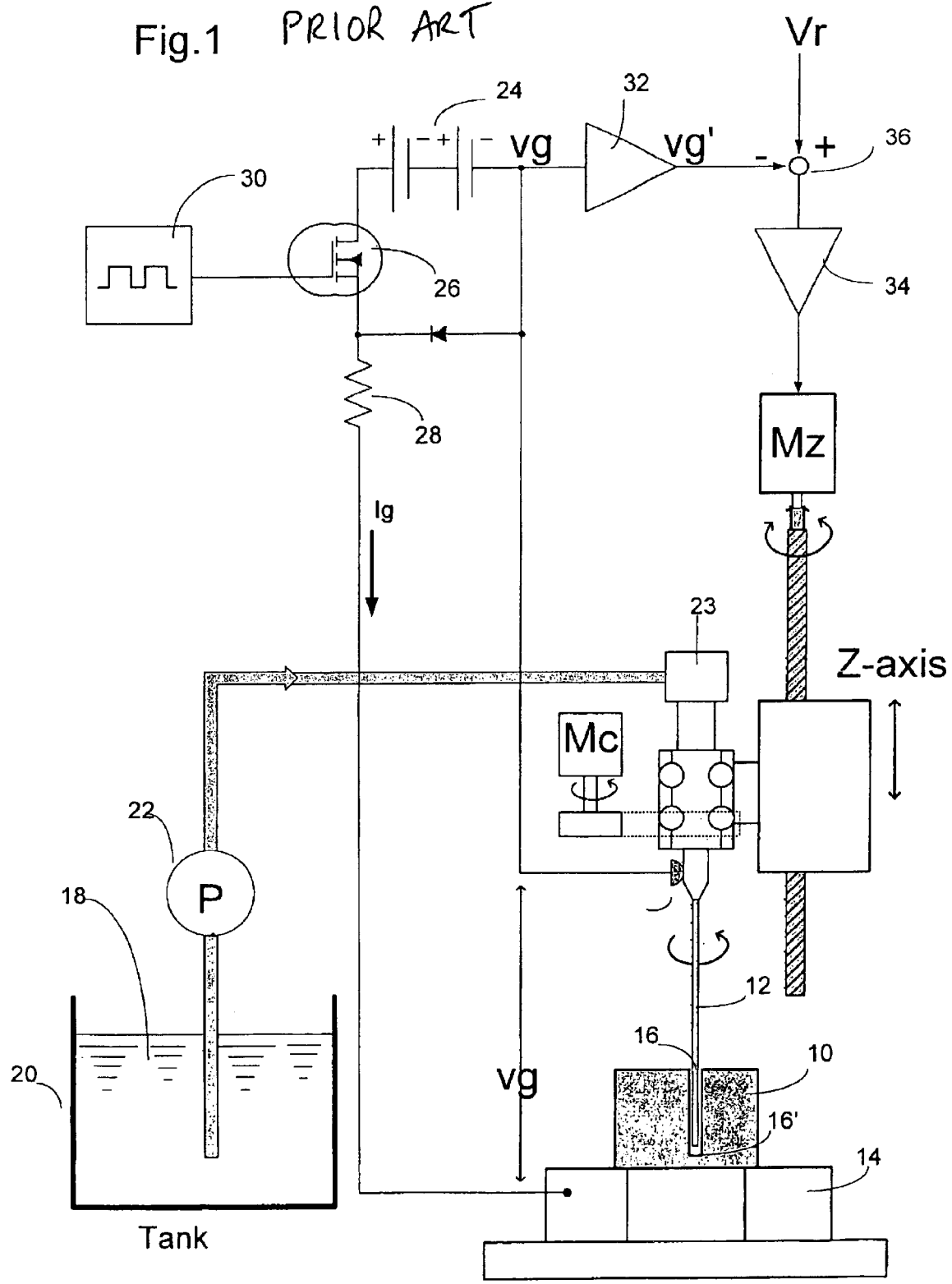
FIG. 1 illustrates a conventional electric spark drill.
Figure 2:
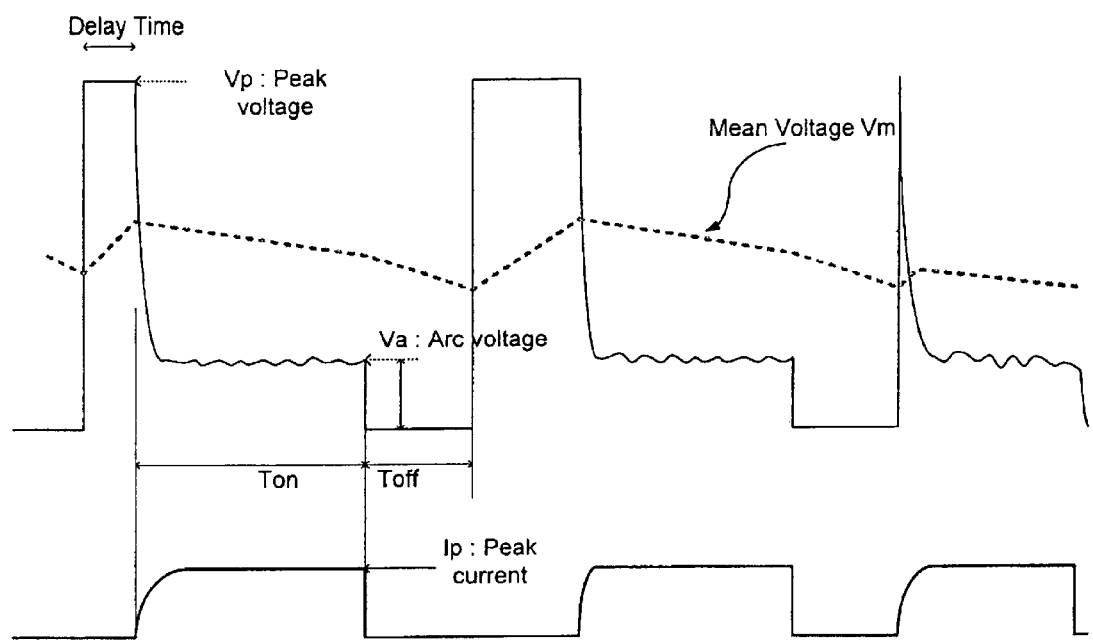
FIG. 2 illustrates the voltage and current curves for the conventional electric spark drill of FIG. 1.
Figure 6:
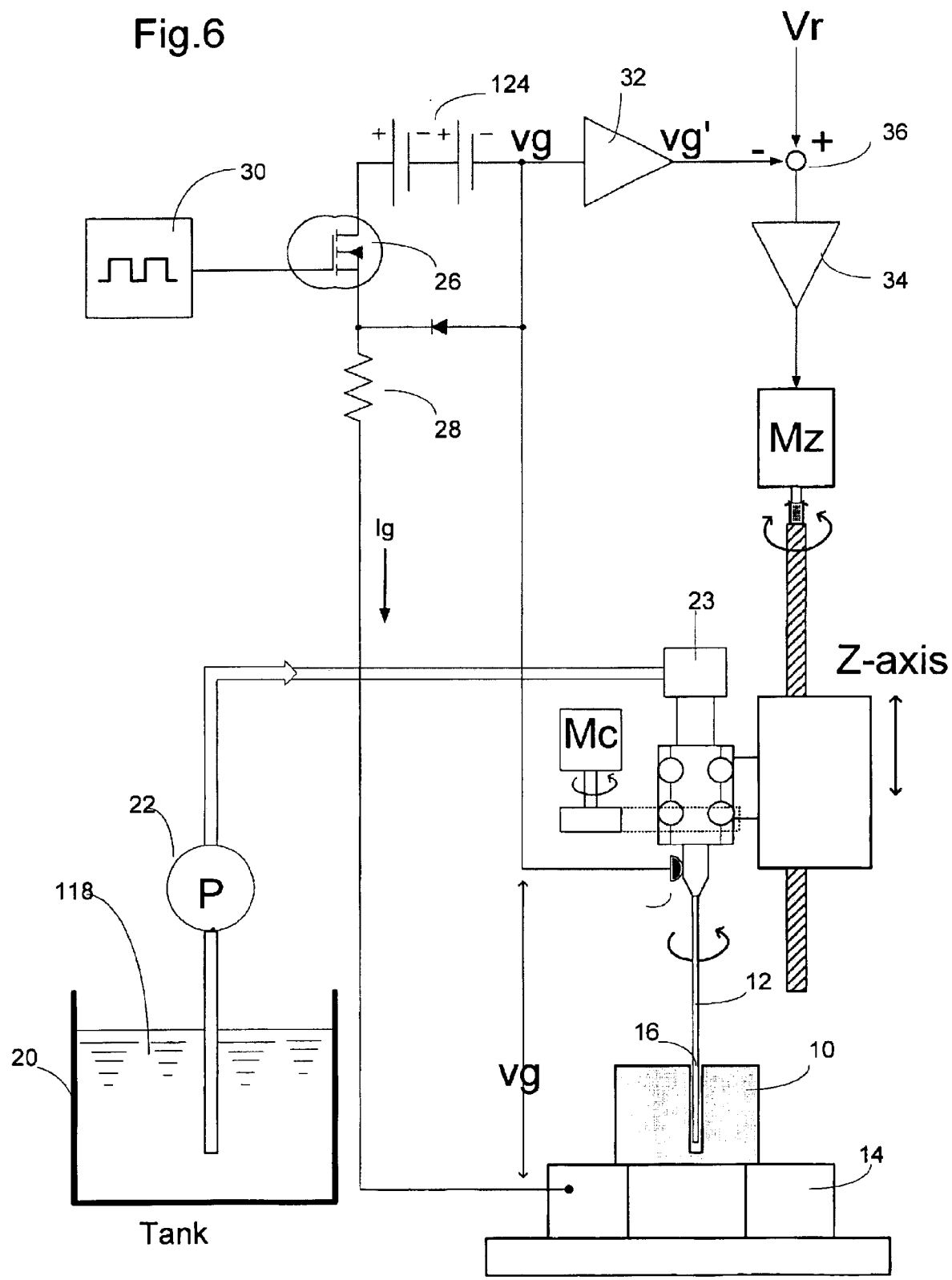
FIG. 6 illustrates the electric sparking drill of the present invention in one exemplary embodiment.

FIG. 6 illustrates one exemplary embodiment of the present invention. The electric sparking drill of FIG. 6 of the present invention is similar to the conventional electric sparking drill of FIG. 1 and therefore, like numerals represent like elements, and a description of which will be omitted here. The first difference between the exemplary embodiment of the present invention illustrated in FIG. 6 and the conventional electric sparking drill illustrated in FIG. 1 is the resistivity of the liquid 118 in tank 20 of the present invention. As described above, in the present invention, as illustrated in FIG. 6, a low resistivity liquid. 118 is utilized, with an exemplary resistivity in the 6,000–10,000 cmΩ range. Such a high resistivity liquid may include standard city-supplied water, which is significantly less expensive than the pure or de-ionized water 18 utilized in the conventional electric sparking drill of FIG. 1. Further, the higher resistivity of the liquid 118 enables the electric sparking drill of FIG. 6 to operate at a much lower voltage than the peak voltage of the electric sparking drill of FIG. 1. As a result, a much smaller DC source 124 can be used in the exemplary embodiment of FIG. 6.

Figure 7:
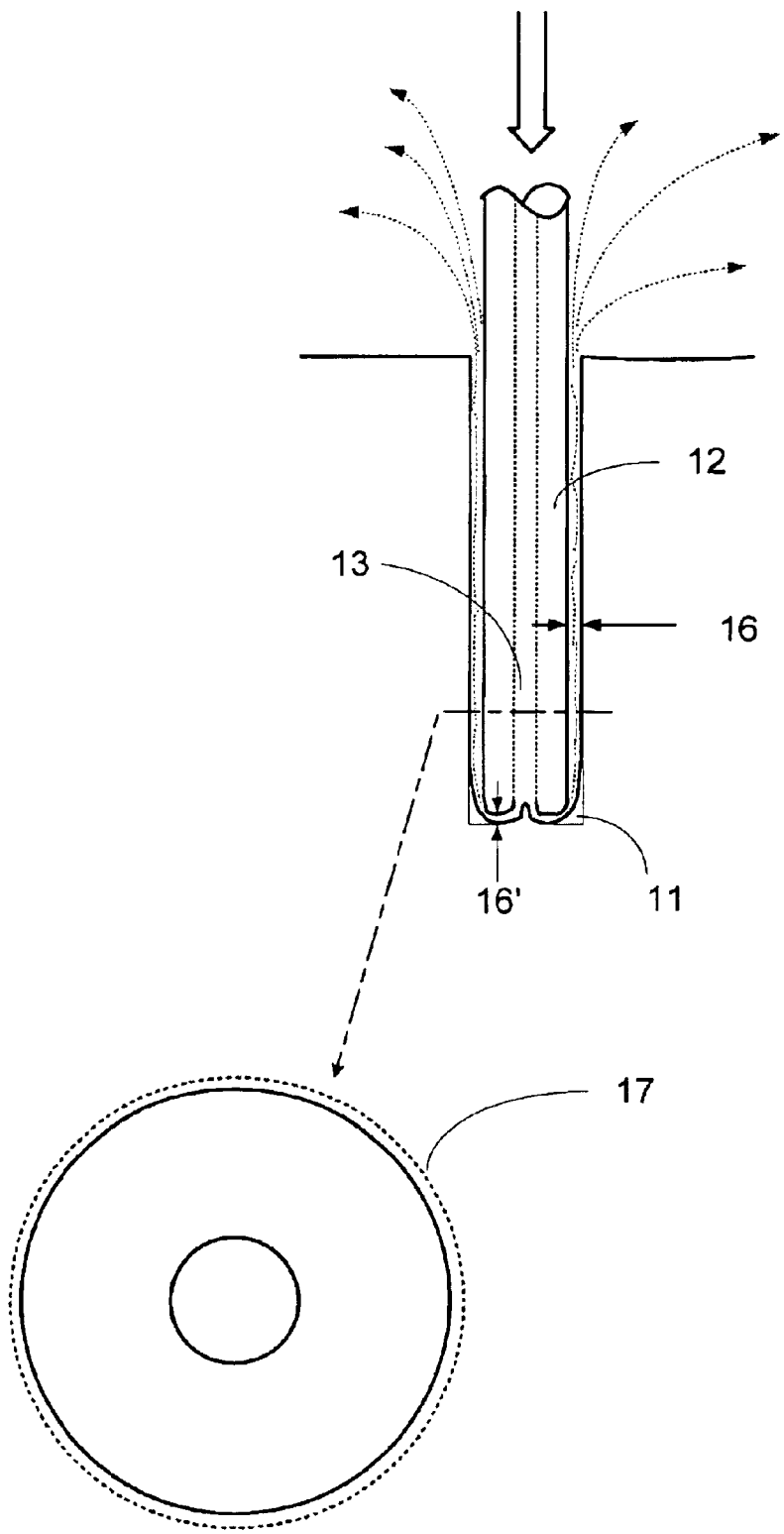
FIG. 7 illustrates the electrode of FIG. 6 in more detail.

Still further, the lower peak voltage of at least this embodiment of the present invention has a positive effect on the wear of the electrode 12, as illustrated in FIG. 7. Due to the lower peak voltage, it is easier in at least this embodiment of the present invention to control conditions such that arcing only occurs at gap 16' and not at gap 16. As a result, a better hole is made without remaining stock areas 11.

Figure 3:
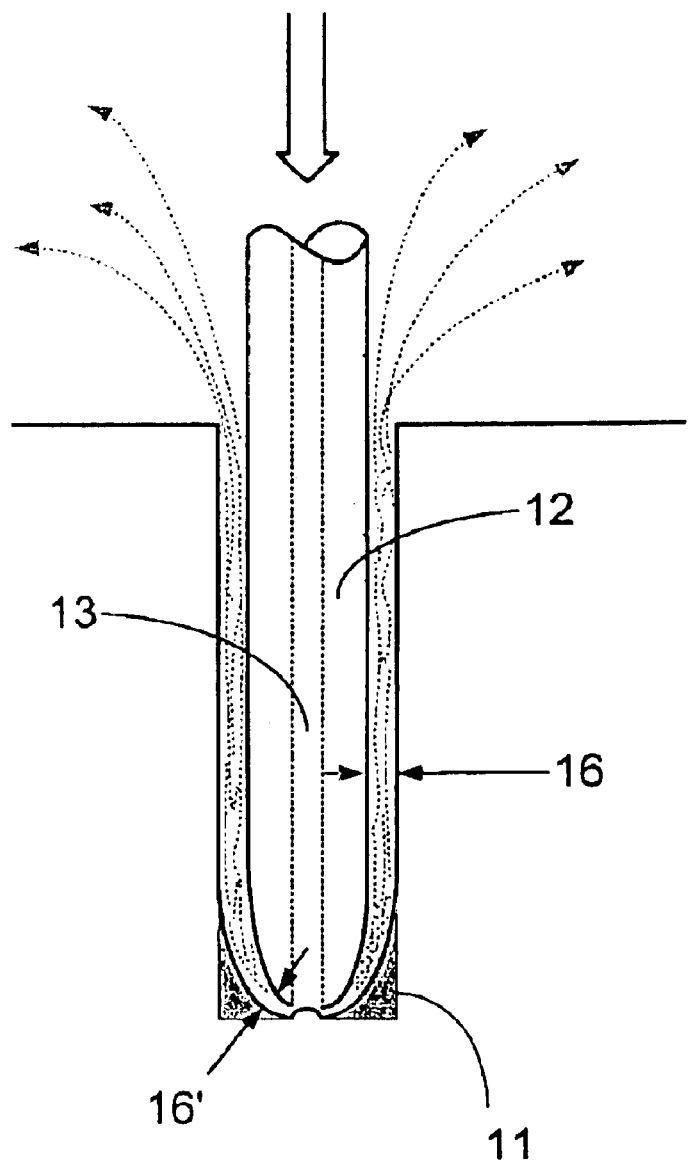
FIG. 3 illustrates the electrode 12 of the conventional electric sparking drill of FIG. 1 in more detail.
Figure 3:

Still further, the electrode 12 wears more evenly, because there is no arcing at gap 16. Because the peak voltage is lower, the exemplary embodiment of FIG. 6 may operate with a smaller gap 16 as compared to the gap 16 illustrated in FIG. 3. Finally, because the peak voltage is lower, the electrode 12 may be coated with an enamel or paint 17 to further improve performance. Such an enamel or paint 17 would easily be removed utilizing the higher voltage operating conditions of the conventional electric spark drill of FIG. 1.

Figure 4:
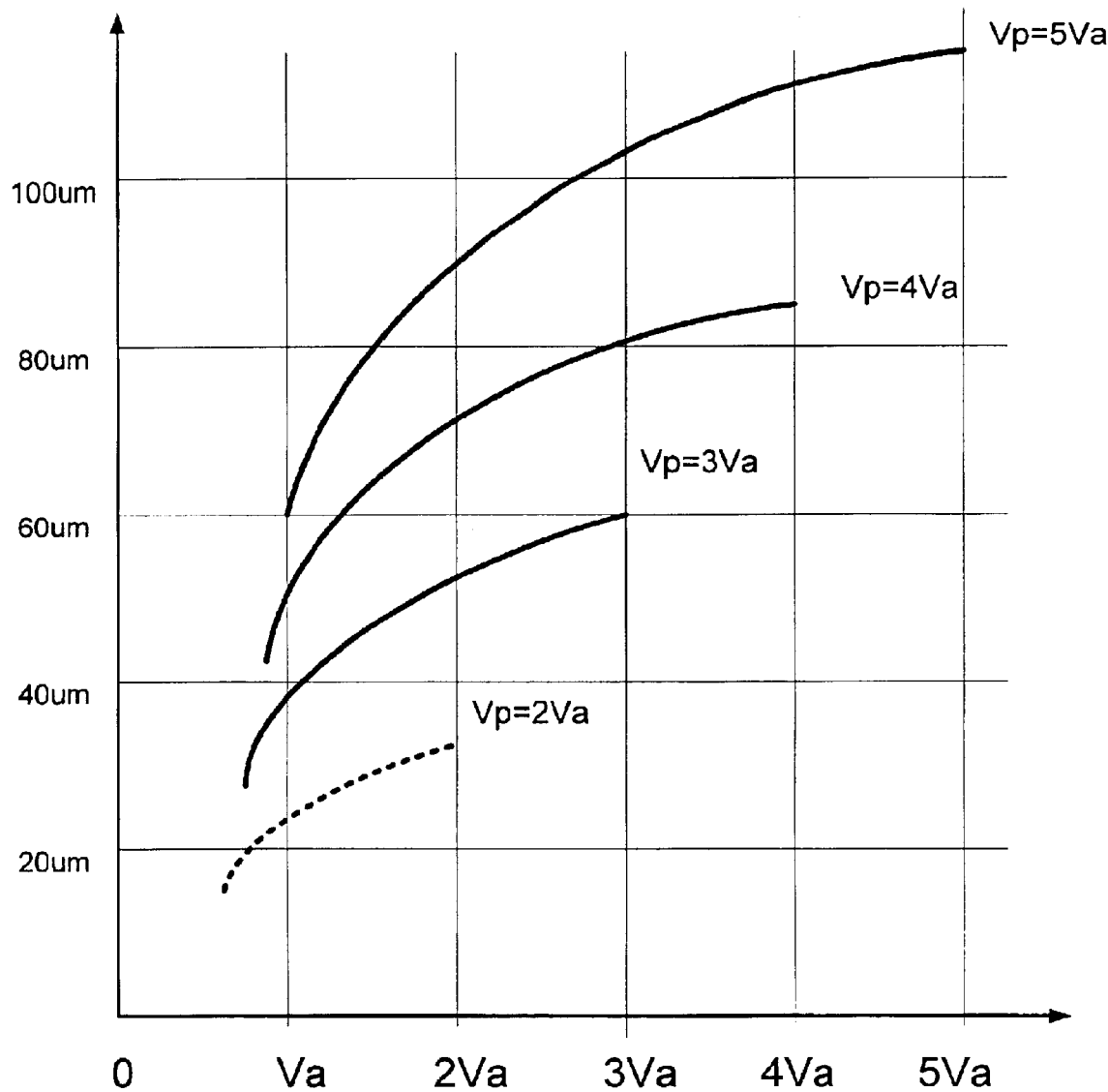
FIG. 4 illustrates arc voltage as a function of gap length for several peak voltages $V_p$.
Figure 5:
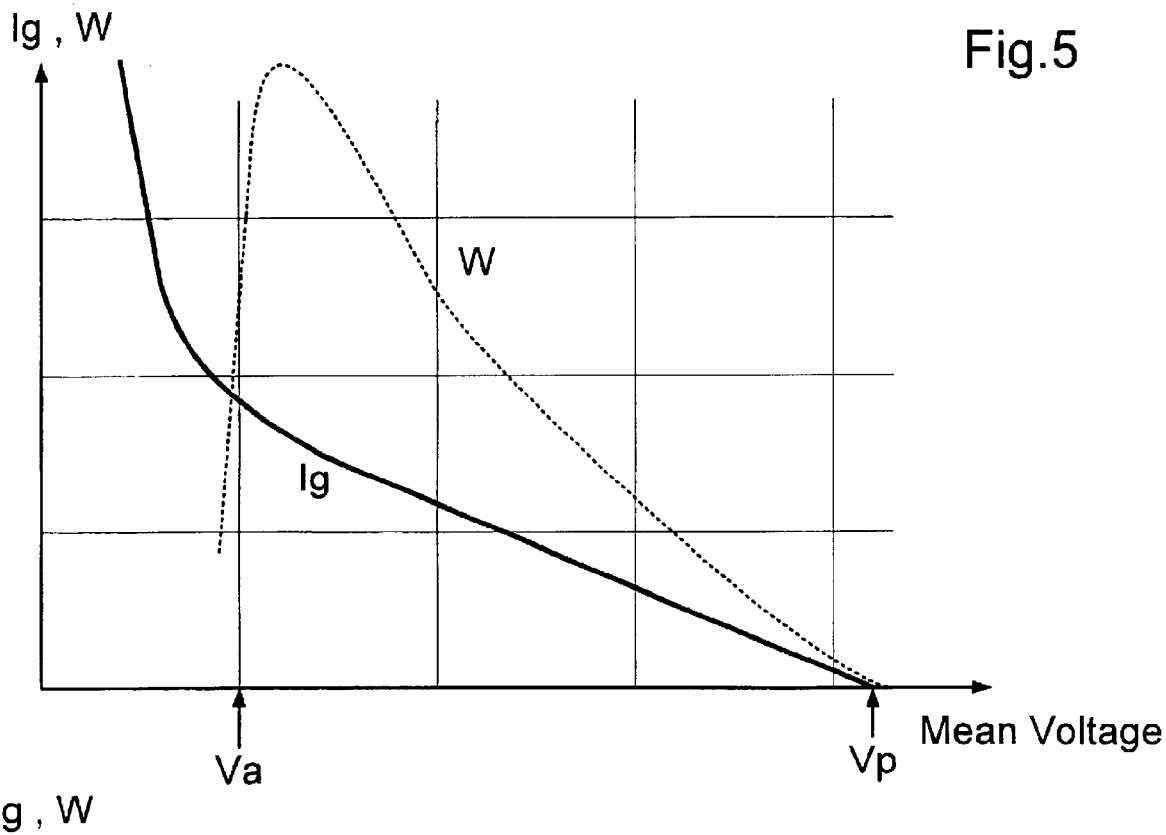
FIG. 5 illustrates a graph of electrode working speed and current as a function of mean voltage and gap distance.
Figure 8:
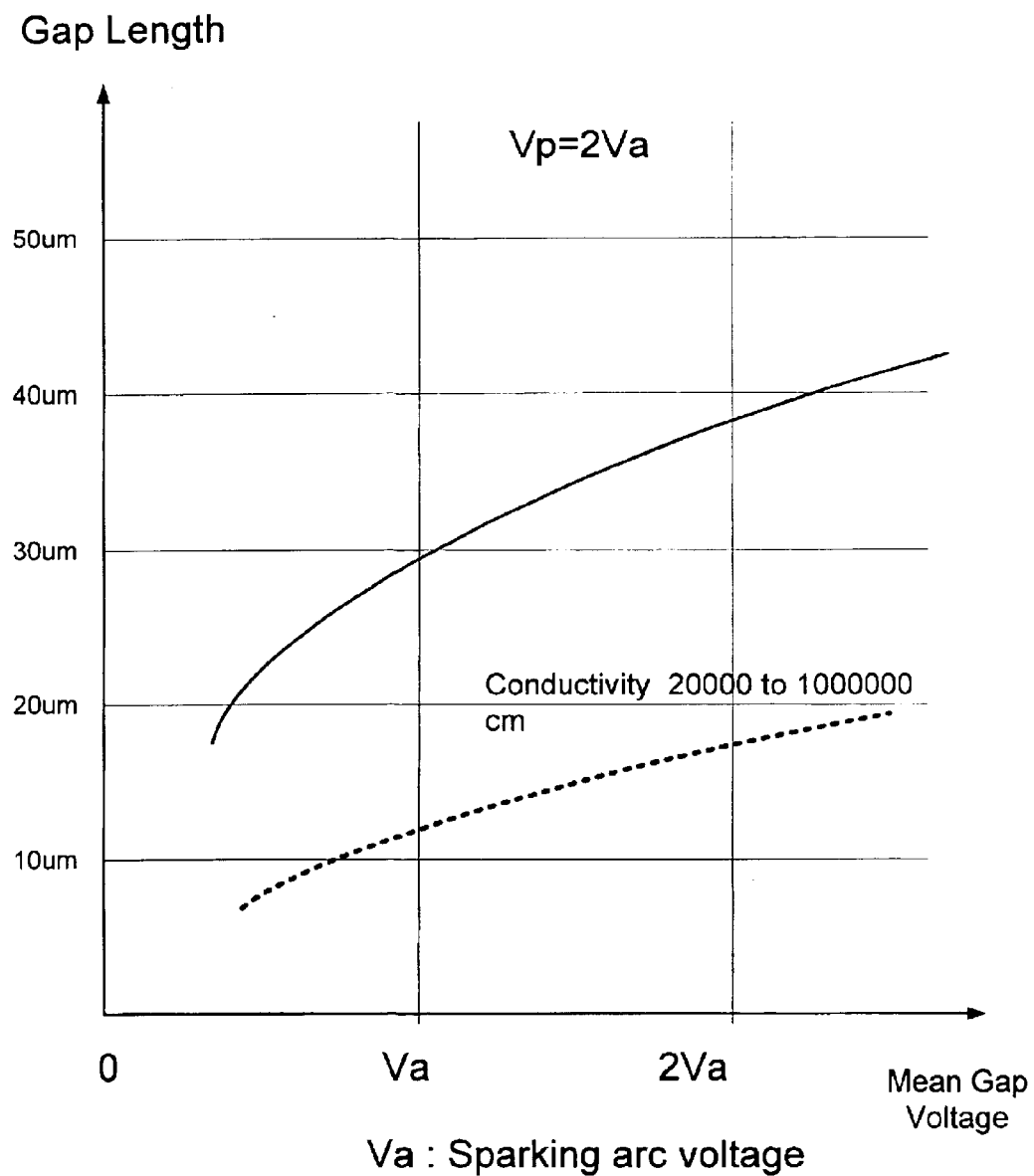
FIG. 8 illustrates the relationship between mean voltage and gap lengths in the exemplary arrangement of FIG. 6.

FIG. 8 illustrates a graph for the exemplary embodiment of FIG. 6, similar to FIG. 4 graph in relation to FIG. 1. As clearly illustrated by FIG. 8, utilizing a liquid 118 with higher resistivity, enables an electric sparking drill to be operated at a lower voltage, and in fact, voltages at and near the arcing voltage. This lower voltage results in less wear on the electrode and produces a more desirable hole through workpiece 10. FIG. 8 illustrates two curves for two different resistivity ranges 5,000–10,000 cmΩ and 20,000–1,000,000 cmΩ.

Figure 9:
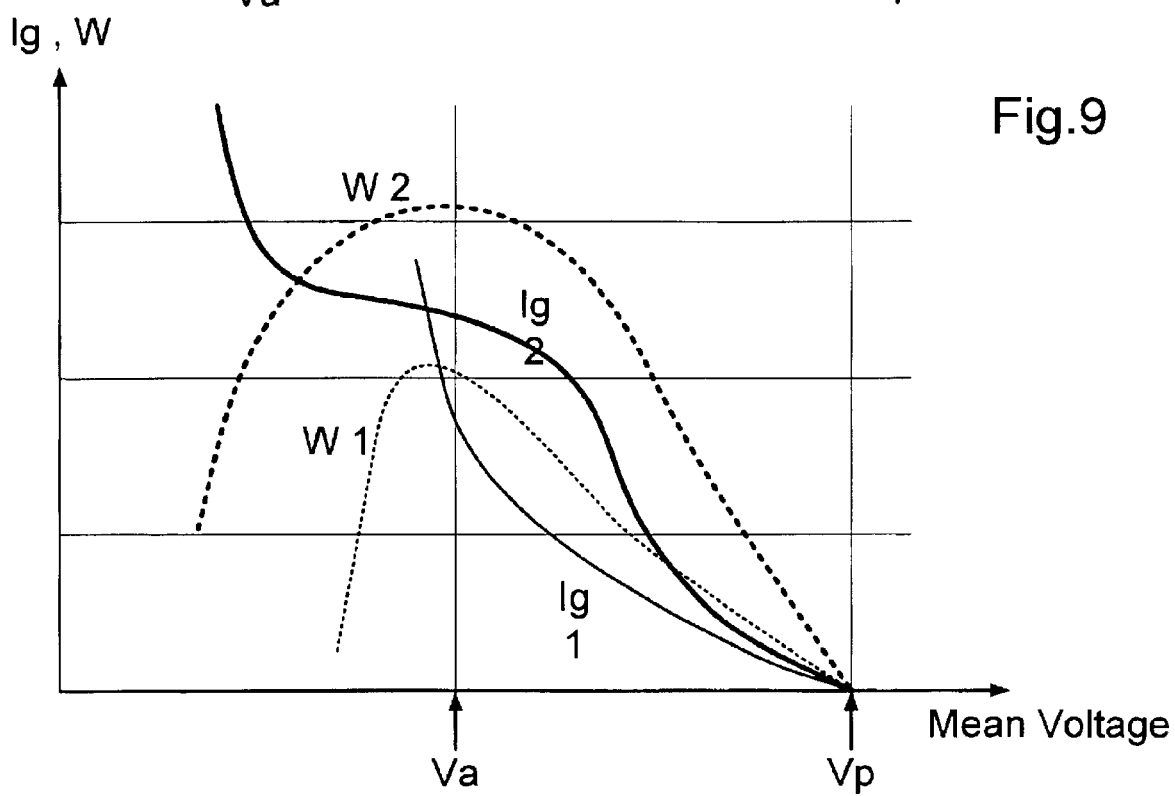
FIG. 9 illustrates a comparison of the electrode working speed and current in the embodiment of FIG. 6 to electrode working speed and current of the conventional electric sparking drill of FIG. 1.

FIG. 9 is a comparison of the working speed W and current Ig of the conventional electric drill illustrated in FIG. 1 compared to the working speed W and the current Ig generated in the exemplary embodiment illustrated in FIG. 6. In FIG. 9, W1 and Ig1 correspond to the conventional electric sparking drill as illustrated in FIG. 1, whereas W2 and Ig2 correspond to the exemplary embodiment illustrated in FIG. 6.

As illustrated by curve W2, the lower voltage/higher resistivity arrangement of the exemplary embodiment of FIG. 6 provides a wider operating range than the conventional electric sparking drill of FIG. 1. Still further, the low voltage/high resistivity arrangement of the exemplary embodiment of FIG. 6 permits the mean voltage to be at or very close to the arcing voltage, $V_a$. As illustrated in FIG. 9, exemplary embodiment of FIG. 6 does not become unstable or uncontrollable until about one-half the arcing voltage, $V_a$.

Figure 10:
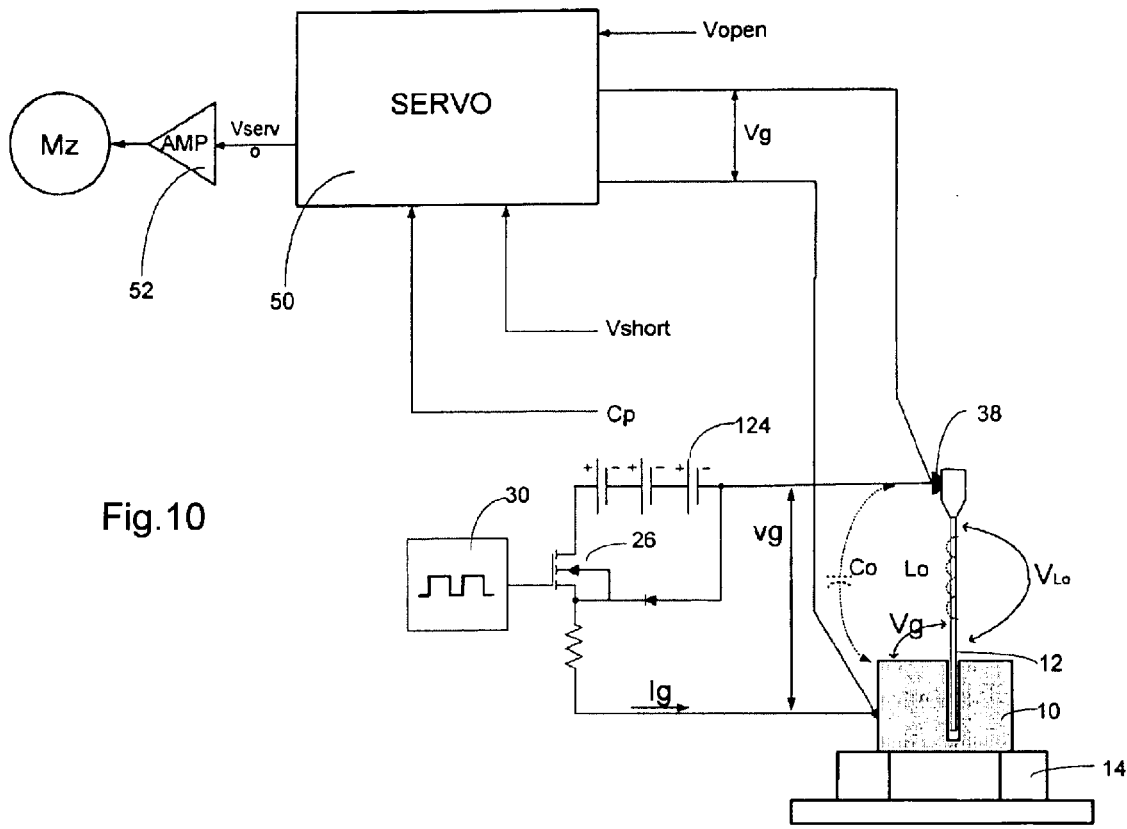
FIG. 10 illustrates another exemplary embodiment of the present invention, wherein a servo is utilized to control the applied voltage.

FIG. 10 illustrates another exemplary embodiment of the present invention, where a servo 50 and optional amplifier 52 are used to control the voltage provided to the electrode 12. In the embodiment illustrated in FIG. 10, the voltage between the gap 16' is sampled while the machining takes place and the servo 50 is utilized to either advance (forward), stop or retreat (back) the machine.

Figure 11:
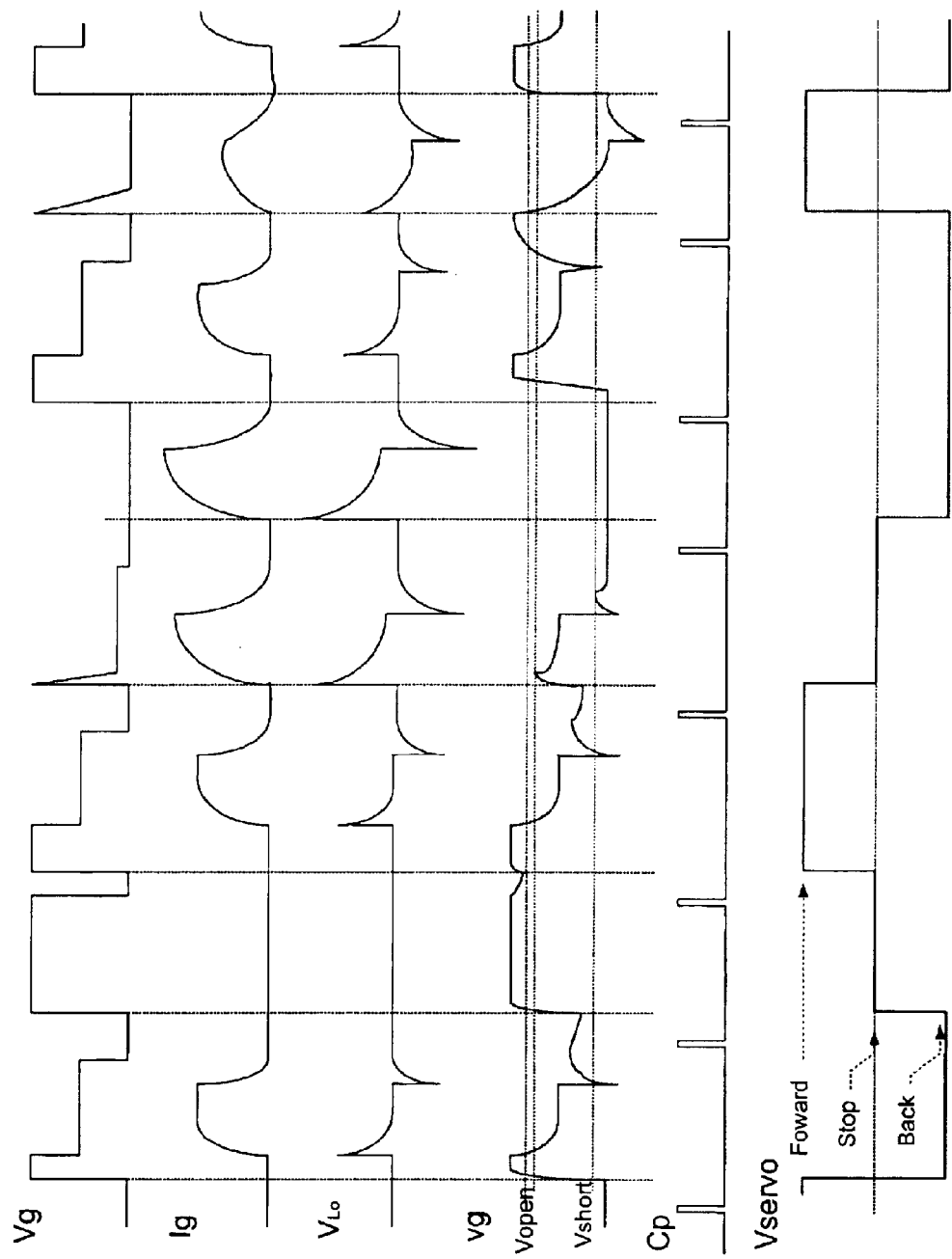
FIG. 11 illustrates exemplary waveforms of the arrangement of FIG. 10.

FIG. 11 illustrates exemplary waveforms in one exemplary embodiment of FIG. 10. Where $V_g$ is the gap voltage, $I_g$ is the gap current, $V_{open}$, and $V_{short}$ are possible voltages at the gap 16'. $C_p$ identifies a control pulse, which is generated by the pulse generator 30, which is generated during an end of an off-time of the switching element 26, as driven by the pulse generator 30. The servo 50 indicates the condition of the servo voltage $V_{servo}$ at any given time. The $V_g$, $V_{open}$ $V_{short}$ waveforms dictate the gap situation, open, short, or normal, at any given time. If the voltage is below $V_{short}$, the gap situation is a short circuit. If the voltage is above the $V_{open}$, voltage, the gap situation is an open circuit. If the waveform is between $V_{open}$ and $V_{short}$, the gap situation is a normal arcing situation. $C_p$ provides the pulse at which point this wave form is sampled in order to determine what sort of server operation is required to bring the system into a normal arcing condition.

Figure 12:
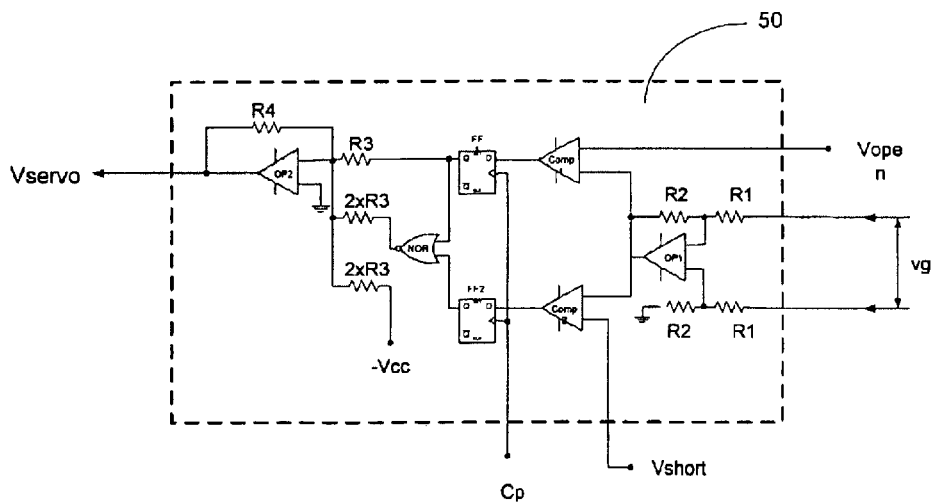
FIG. 12 illustrates an exemplary embodiment of the servo of FIG. 10 in more detail.

FIG. 12 illustrates an exemplary embodiment of circuitry which implements the servo 50 of FIG. 10. It is noted that this circuit is merely exemplary and other circuits could also be utilized, as would be known to one of ordinary skill in the art.

Figure 13:
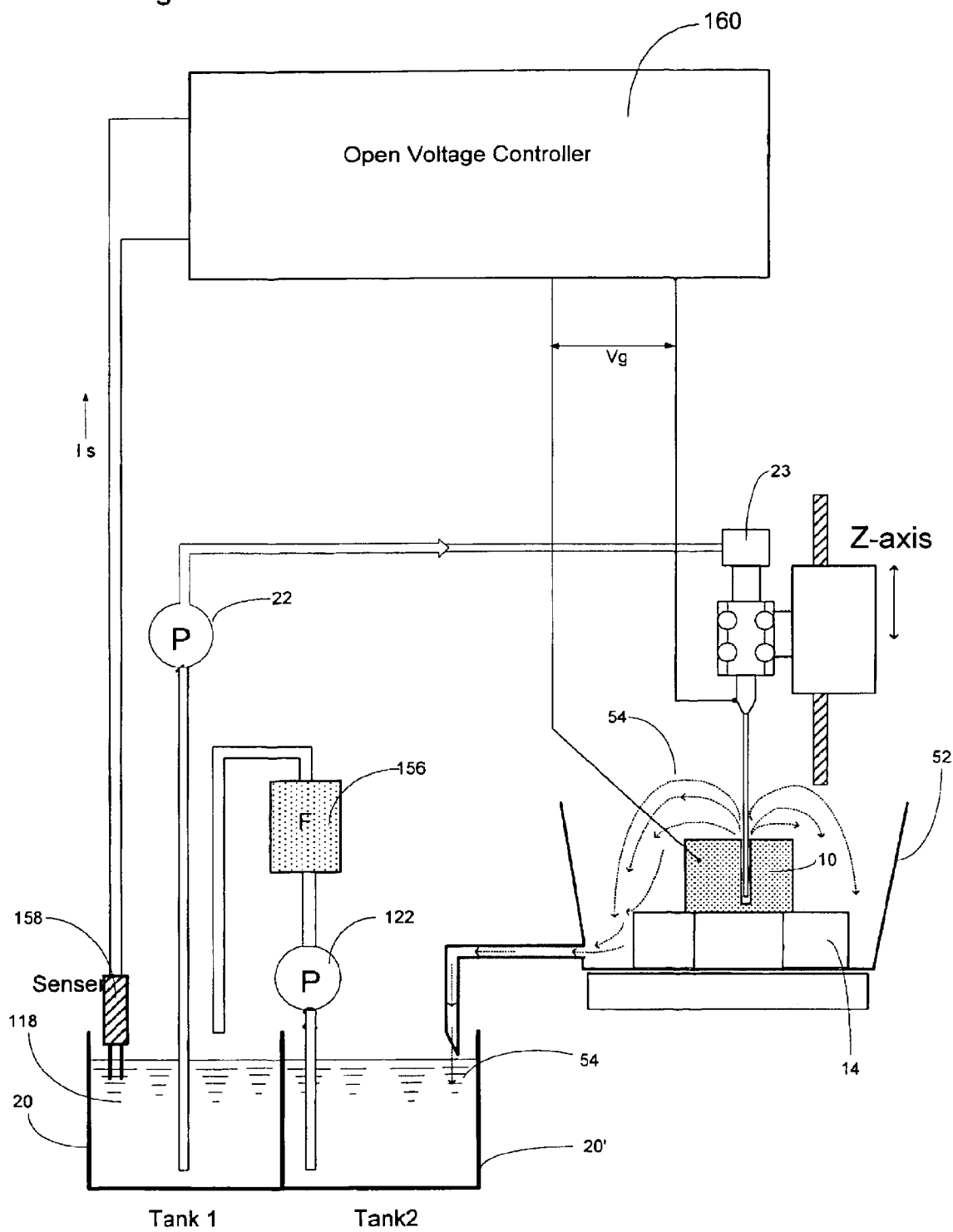
FIG. 13 illustrates another exemplary embodiment of the present invention which implements an open voltage controller which responds according to the resistivity of a liquid.

FIG. 13 illustrates another exemplary embodiment of the present invention where the open voltage is controlled according to the resistivity of the liquid 118. In the exemplary embodiment illustrated in FIG. 13, the electrode 12 is machined into the workpiece 10 where container 52 or other suitable structure collects the discharge 54, which includes the high conductivity liquid 118 and any sludge or other particles produced as a result of the machining. The discharge 54 is fed into tank 20', holding liquid which has the same conductivity as the liquid 118 in tank 20. The discharge 54 is pumped via pump 122 to a filter 156 which filters out particulates and outputs the filtered discharge 44 into tank 20.

A sensor 158 detects the conductivity of the liquid 118 (typically by measuring a current and determining the conductivity from the current, but other measurements are possible). The output of the sensor 158 is provided to an open voltage controller 160 which adjusts the voltage $V_g$ supplied to the electrode 12 and workpiece 10, depending on the conductivity of the liquid 118 in tank 20. In this manner, the voltage can be increased or decreased, depending on whether the conductivity of the liquid 118 is decreasing or increasing, respectively.

Figure 14:
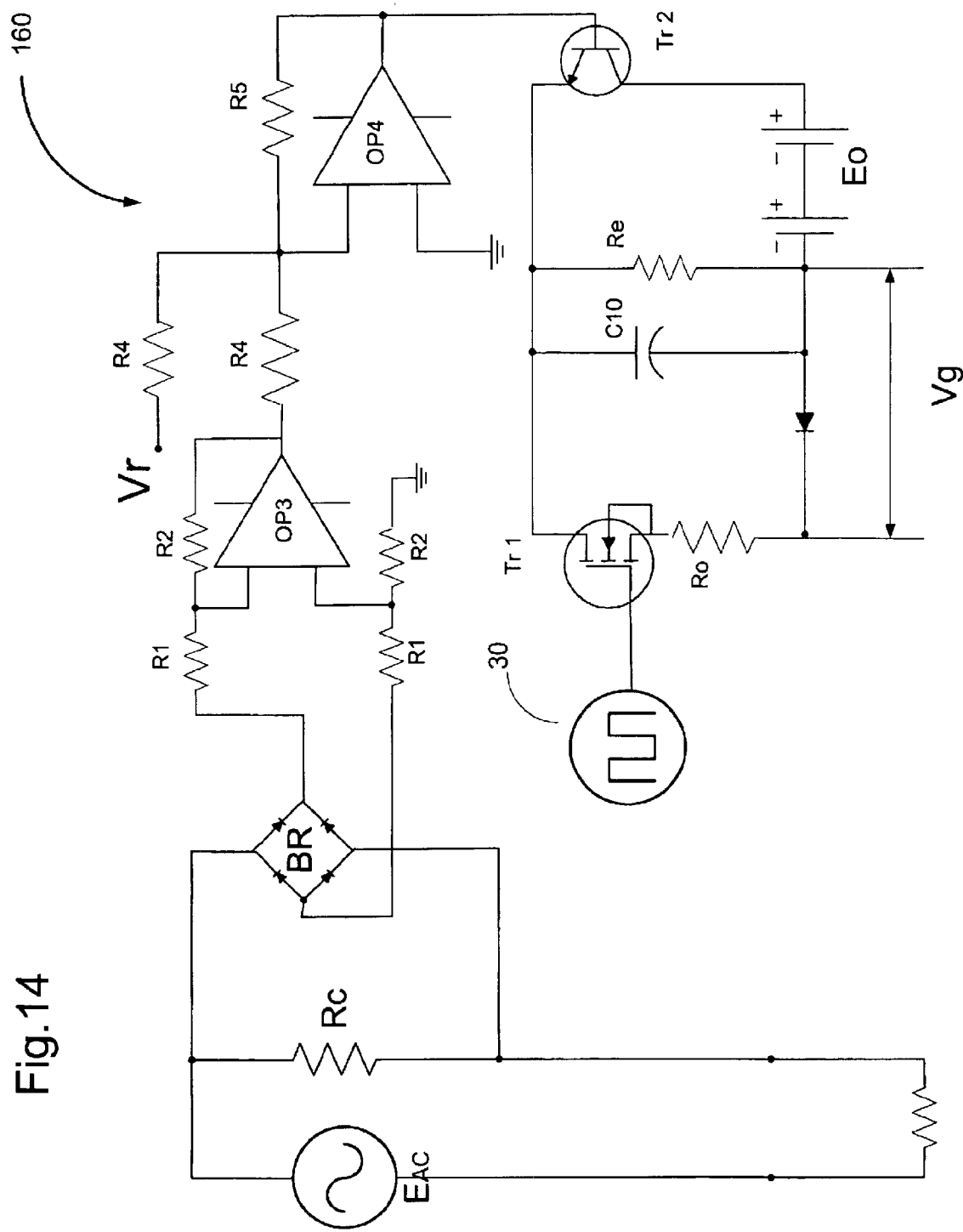
FIG. 14 illustrates an exemplary embodiment of the open voltage controller of FIG. 13 in more detail.

FIG. 14 illustrates an exemplary implementation of the open voltage controller 160 of FIG. 13. It is noted that this implementation is exemplary and could be varied as would be known to one of ordinary skill in the art.

Figure 15:
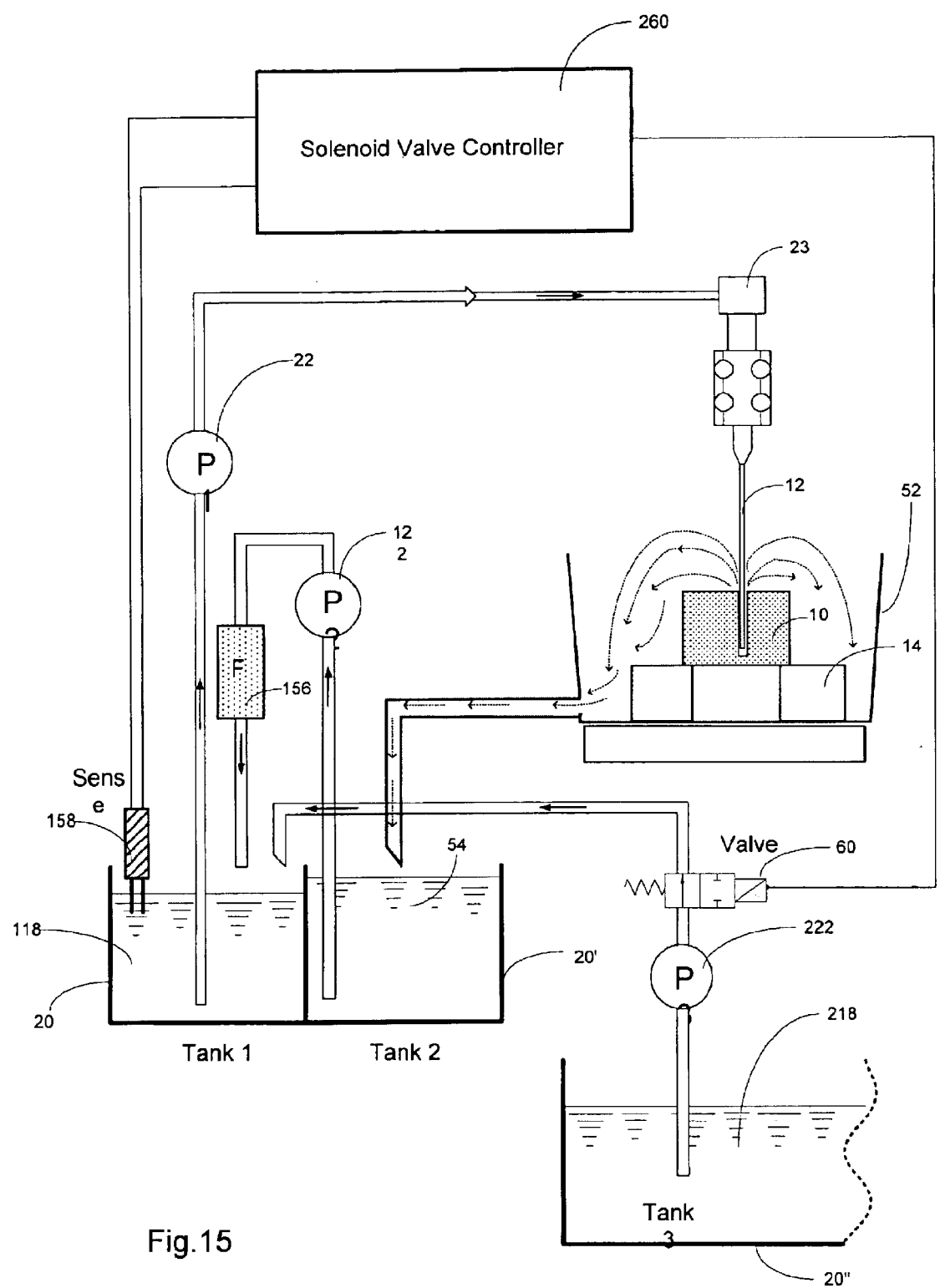
FIG. 15 illustrates an exemplary embodiment of an open voltage controller which controls the open voltage applied depending on the resistivity of the liquid utilizing a source of high resistivity liquid.

FIG. 15 illustrates another exemplary embodiment of the present invention which also utilizes open voltage control to control the operation of the electric sparking drill. The embodiment of FIG. 15 is similar to the embodiment of FIG. 13, with the exception that a third tank 20" containing pure or de-ionized liquid is provided and a third pump 222 is utilized to pump the pure or de-ionized liquid 218 from tank 20' to tank 20, depending on the position of valve 60. Valve 60 is open or closed, depending on operation of the voltage controller 260. Open voltage controller 260 uses an output of the sensor 158 to determine the resistivity of liquid 118. If the conductivity is too high, open voltage controller 260 opens valve 60 to thereby supply pure or de-ionized liquid 218 from tank 20' to tank 20 in order to decrease the conductivity of liquid 118. Otherwise, the exemplary embodiment illustrated in FIG. 15 operates essentially the same as the exemplary embodiment illustrated in FIG. 13.

Figure 16:
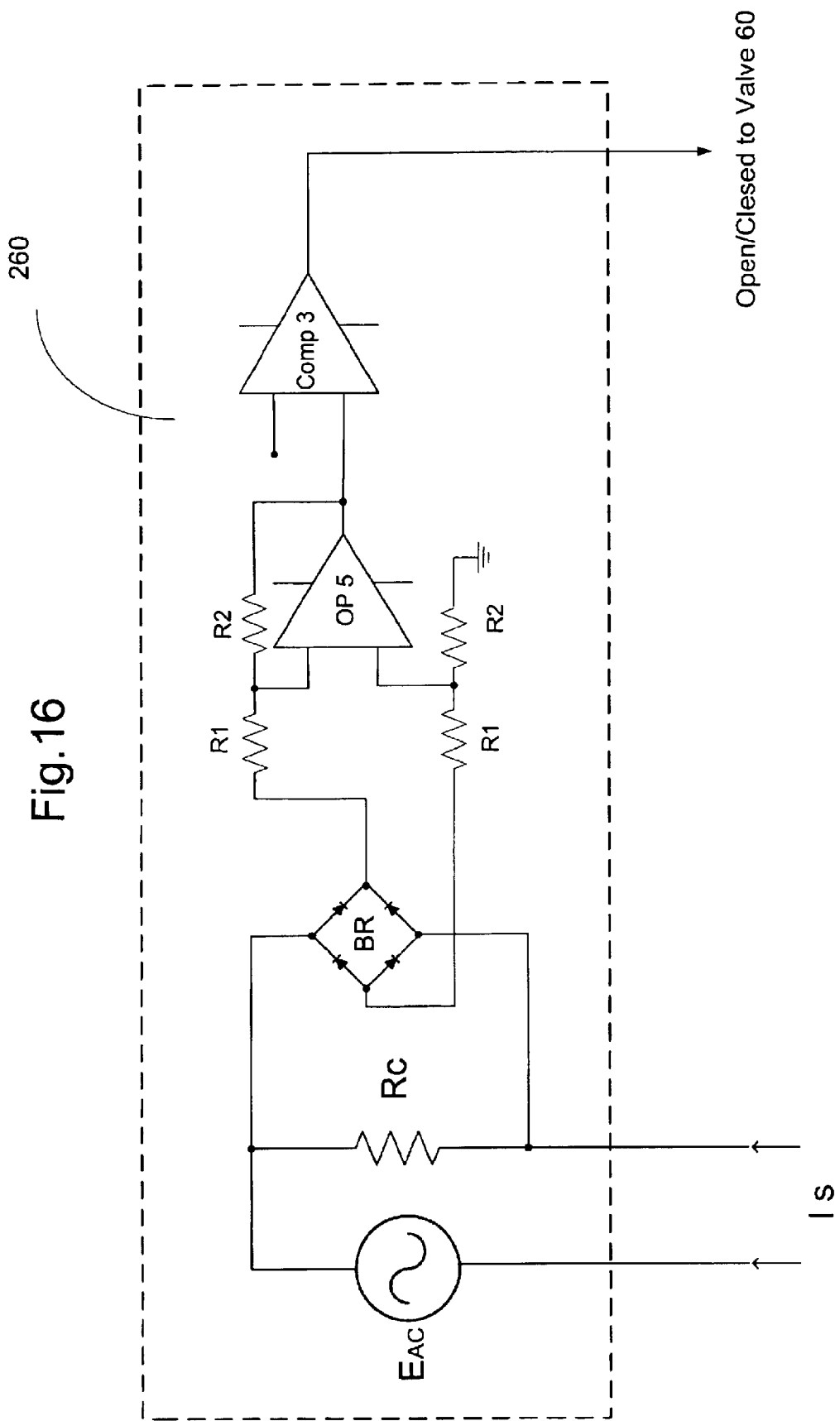
FIG. 16 illustrates an exemplary embodiment of the open voltage controller of FIG. 15 in more detail.

FIG. 16 illustrates an exemplary implementation of the open voltage controller 260 of FIG. 15. The open voltage 260 receives the current Is from the sensor 158, which is representative of the conductivity of liquid 118 and produces and OPEN/CLOSE signal to valve 60 in order to control whether or not the de-ionized or pure liquid 218 is supplied from tank 20' to tank 20, in order to lower the conductivity of liquid 118. It is noted that the implementation illustrated in FIG. 16 is merely exemplary and other implementations would be known to one of ordinary skill in the art.

Figure 17:
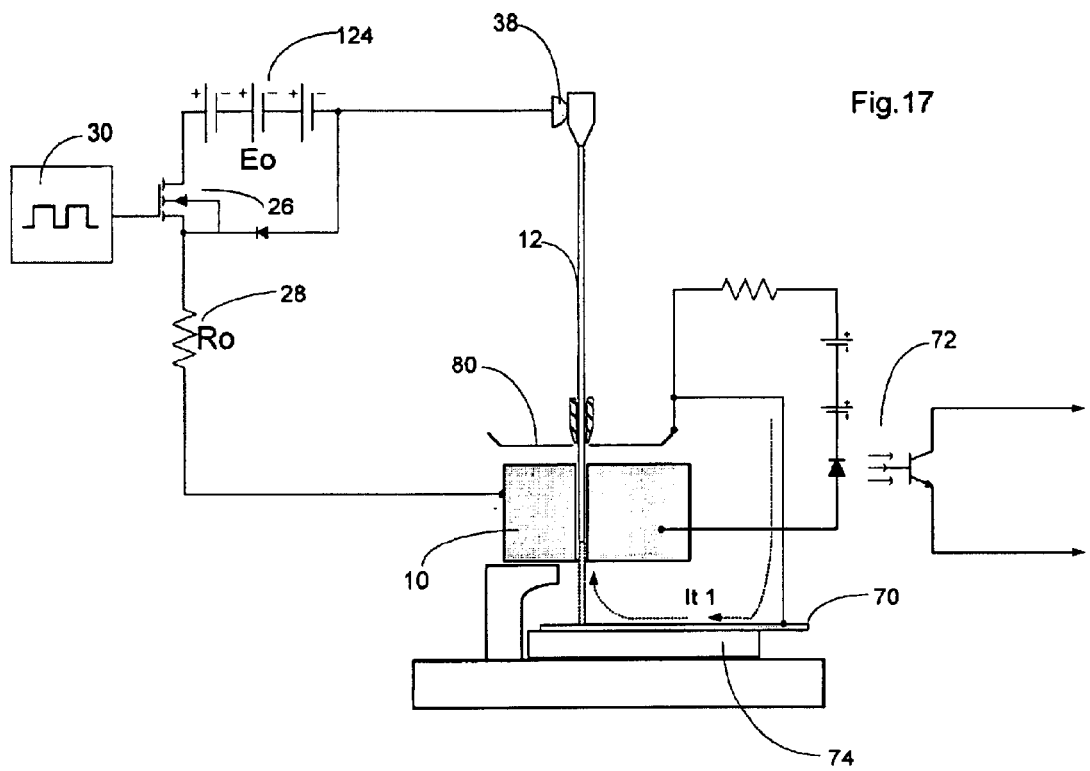
FIG. 17 illustrates another embodiment of the present invention which includes a sacrificial electrode and a touch step function.

FIG. 17 illustrates yet another exemplary embodiment of the present invention. The exemplary embodiment of FIG. 17 illustrates two additional features of the present invention. It is noted that although these two features are described together, they may also be used separately or in combination with other features described herein. The first feature of FIG. 17 is a touch stop feature, by which when the electrode 12 completely passes through the workpiece 10, the electrode 12 completes a circuit, which produces a signal to stop drilling. In the exemplary embodiment of FIG. 17, the electrode 12 hits a touch plate 70. Touch stop circuit 72 (which is also exemplary), the touch plate 70 and electrode 12 complete a circuit. When the electrode 12 hits the touch plate 70, a signal is produced indicating that the Mz motor should be stopped. In order to avoid a short circuit, an insulating member, such as a rubber sheet 74 should be utilized between the touch stop plate 70 and the base of the electric sparking drill.

A second feature of the embodiment illustrated in FIG. 17 is the use of a sacrificial electrode 80. In normal operation, the electrode 12 has a negative polarity and the workpiece 10 has a positive polarity. These polarities encourage ions from the surface of the workpiece 10 to migrate to the electrode 12, thereby causing a type of corrosion. This is particularly true if the workpiece 10 is made of a compressed powder, such as tungsten carbide with a cobalt binder. Such a workpiece 10 is easy to erode and suffers from the migration of ions from the workpiece 10 to the electrode 12.

In order to decrease the probability of ions from migrating from the workpiece 10 to the electrode 12, a sacrificial electrode 80 is provided which has a higher positive polarity than the workpiece 10. As a result, ions migrate from the sacrificial electrode 80, instead of eroding' the workpiece 10. It is noted in an alternative embodiment, the polarities of the electrode 12 and the workpiece 10 could be reversed.

Figure 18:
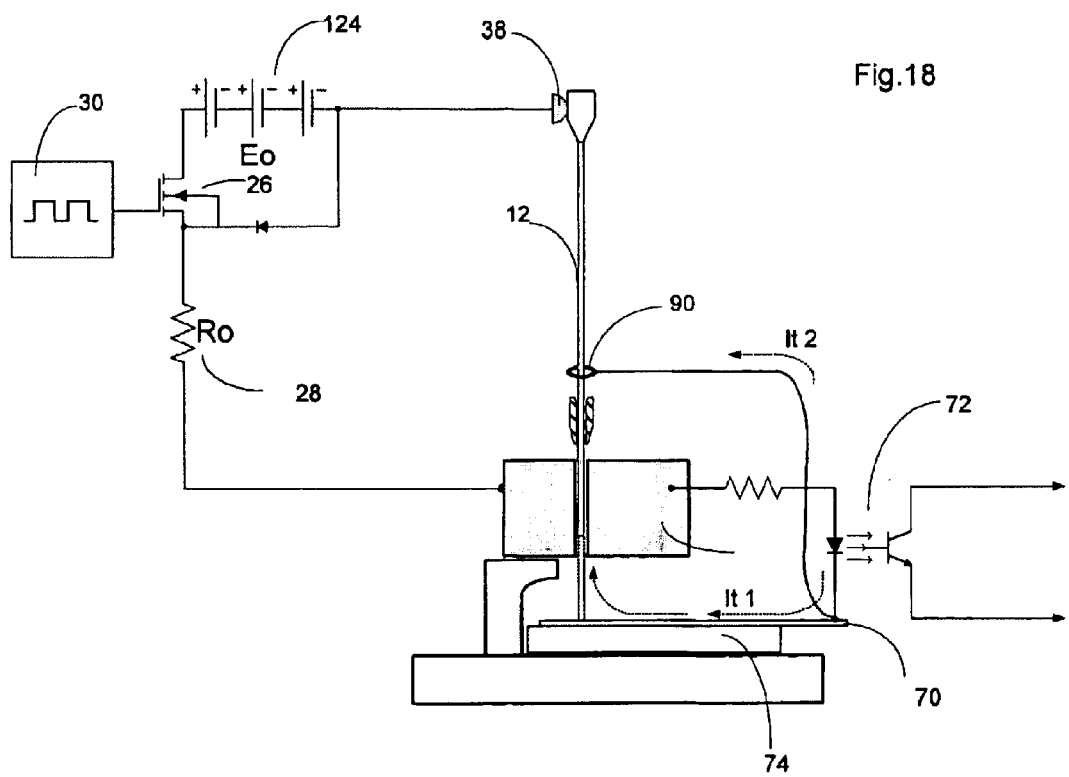
FIG. 18 illustrates yet another embodiment of the present invention which implements an electrode guide function and the touch step function.

In yet another exemplary embodiment of the present invention as illustrated in FIG. 18, the touch stop feature described in FIG. 17 is combined with a guide member feature. In particular, when using electrodes 12 which are extremely thin tubes, with very small outer and inner diameters, it is possible that the electrode 12 will begin to vibrate. This is a condition that is not favorable to producing a quality hole. As a result, a guide sensor 90 is provided (roughly around the middle of electrode 12). If electrode 12 begins to vibrate too much, the electrode 12 contacts the guide sensor 90 to complete a circuit to generate a current It1. If this current is detected, that is an indication that the electrode 12 is touching guide sensor 90 and the motor Mc should be stopped.

It is noted that in the exemplary embodiment of FIG. 17, the touch stop feature and the sacrificial electrode feature are described in combination. Further, in FIG. 18, the touch stop feature and the guide member feature are described in combination. However, the present invention should not be limited to these combinations. In particular, the touch stop feature, the touch stop feature, the guide member feature and the sacrificial electrode feature could all be utilized in combination together. Similarly, it should be noted that other combinations would be known to one of ordinary skill in the art.

It should be noted that various features have been described herein. With respect to the conductivity or voltage control features, it is noted that these features may be used alone or in combination with one another and may be used to control the parameters described herein and/or others to obtain the desired result.

It is further the noted the other of the features described herein, such the sacrificial electrode, the touch stop, and the guide member may also be implemented alone or in combination with one another as well as in combination with any, some, or all of the conductivity or Voltage control features described above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric sparking drill, comprising:
    an electrode for creating an arc at a gap between said electrode and a workpiece;
    a liquid source, for supplying a liquid to the gap;
    a voltage source for applying a voltage, in the range of approximately equal to an arcing voltage to twice the arcing voltage, to said electrode; and
    a controller for controlling at least one of the voltage, a conductivity of the liquid, and a size of the gap to maintain a condition within said gap in an arcing condition to create a desired hole in the workpiece;
    wherein the voltage applied by the voltage source is 17–40 volts.

2. The electric sparking drill of claim 1, wherein the voltage applied by the voltage source is a mean voltage lower than an open voltage.

3. The electric sparking drill of claim 1, wherein said electrode is coated with at least one of enamel and paint.

4. The electric sparking drill of claim 1, wherein the liquid is a low resistivity liquid.

5. The electric sparking drill of claim 1, wherein the liquid has a resistivity of 6,000–10,000 cmΩ.

6. The electric sparking drill of claim 1, wherein said controller includes a servo for measuring the voltage and adjusting the gap by advancing, maintaining or reversing said electrode.

7. The electric sparking drill of claim 1, further comprising:
    a touch stop element, positioned such that when said electrode penetrates through the workpiece, said electrode touches said touch stop element to complete a circuit and generates a detachable signal, and
    a detector for detecting the signal and stopping said electrode in response to the signal.

8. An electric sparking drill, comprising:
    an electrode for creating an arc at a gap between said electrode and a workpiece;
    a liquid source, for supplying a liquid to the gap;
    a voltage source for applying a voltage, in the range of approximately equal to an arcing voltage to twice the arcing voltage, to said electrode; and
    a controller for controlling at least one of the voltage, a conductivity of the liquid, and a size of the gap to maintain a condition within said gap in an arcing condition to create a desired hole in the workpiece;
    wherein said controller includes a voltage controller for controlling the voltage applied to said electrode based on the conductivity of the liquid.

9. An electric sparking drill, comprising:
    an electrode for creating an arc at a gap between said electrode and a workpiece;
    a liquid source, for supplying a liquid to the gap;
    a voltage source for applying a voltage, in the range of approximately equal to an arcing voltage to twice the arcing voltage, to said electrode; and
    a controller for controlling at least one of the voltage, a conductivity of the liquid, and a size of the gap to maintain a condition within said gap in an arcing condition to create a desired hole in the workpiece;
    wherein said controller includes conductivity controller for adjusting the conductivity of the liquid based on the applied voltage.

10. An electric sparking drill, comprising:
    an electrode for creating an arc at a gap between said electrode and a workpiece;
    a liquid source, for supplying a liquid to the gap;
    a voltage source for applying a voltage, in the range of approximately equal to an arcing voltage to twice the arcing voltage, to said electrode; and
    a controller for controlling at least one of the voltage, a conductivity of the liquid, and a size of the gap to maintain a condition within said gap in an arcing condition to create a desired hole in the workpiece;
    wherein said servo controls said electrode to advance, maintain, or reverse in response to a control pulse produced by a pulse generator, which is generated during an end of an off-time of a switching element.

11. The electric sparking drill of claim 10, wherein the liquid is a low resistivity liquid.

12. The electric sparking drill of claim 10, wherein the liquid has a resistivity of 6,000–10,000 cmΩ.

13. An electric sparking drill, comprising:
    an electrode for creating an arc at a gap between said electrode and a workpiece;
    a liquid source, for supplying a liquid to the gap;
    a voltage source for applying a voltage, in the range of approximately equal to an arcing voltage to twice the arcing voltage, to said electrode; and
    a controller for controlling at least one of the voltage, a conductivity of the liquid, and a size of the gap to maintain a condition within said gap in an arcing condition to create a desired hole in the workpiece;
    a guide member, positioned such that when said electrode vibrates while penetrating through the workpiece, said electrode touches said guide member to complete a circuit and generates a detachable signal, and
    a detector for detecting the signal and stopping said electrode in response to the signal.

14. An electric sparking drill, comprising:
    an electrode for creating an arc at a gap between said electrode and a workpiece;
    a liquid source, for supplying a liquid to the gap;
    a voltage source for applying a voltage, in the range of approximately equal to an arcing voltage to twice the arcing voltage, to said electrode; and
    a controller for controlling at least one of the voltage, a conductivity of the liquid, and a size of the gap to maintain a condition within said gap in an arcing condition to create a desired hole in the workpiece;
    a sacrificial electrode, positioned near said electrode and the workpiece, to permit ions to migrate from said sacrificial electrode to said electrode and prevent ions from migrating from the workpiece to said electrode.

15. A method of forming a hole with an electric spark, comprising:
    creating an arc at a gap between an electrode and a workpiece;
    supplying a liquid to the gap;
    applying a voltage, in the range of approximately equal to an arcing voltage to twice the arcing voltage, to said electrode; and
    controlling at least one of the voltage, a conductivity of the liquid, and a size of the gap to maintain a condition within said gap in an arcing condition to create a desired hole in the workpiece; wherein the voltage is applied is 17–40 volts.

16. The method of claim 15, wherein the voltage applied is a mean voltage lower than an open voltage.

17. The method of claim 15, wherein the liquid is a low resistivity liquid.

18. The method of claim 15, wherein the liquid has a resistivity of 6,000–10,000 cmΩ.

19. The method of claim 15, wherein said controlling includes measuring the voltage and adjusting the gap by advancing, maintaining or reversing the electrode.

20. The method of claim 15, wherein the electrode is coated with at least one of enamel and paint.

21. The method of claim 15, further comprising:

positioning a touch stop element such that when the electrode penetrates through the workpiece, the electrode touches the touch stop element to complete a circuit and generates a detachable signal, and detecting the signal and stopping the electrode in response to the signal.

22. A method of forming a hole with an electric spark, comprising:

creating an arc at a gap between an electrode and a workpiece;

supplying a liquid to the gap;

applying a voltage, in the range of approximately equal to an arcing voltage to twice the arcing voltage, to said electrode; and controlling at least one of the voltage, a conductivity of the liquid, and a size of the gap to maintain a condition within said gap in an arcing condition to create a desired hole in the workpiece; wherein said controlling includes adjusting the conductivity of the liquid based on the applied voltage.

23. A method of forming a hole with an electric spark, comprising:

creating an arc at a gap between an electrode and a workpiece;

supplying a liquid to the gap;

applying a voltage, in the range of approximately equal to an arcing voltage to twice the arcing voltage, to said electrode; and controlling at least one of the voltage, a conductivity of the liquid, and a size of the gap to maintain a condition within said gap in an arcing condition to create a desired hole in the workpiece;

positioning a sacrificial electrode near the electrode and the workpiece, to permit ions to migrate from the sacrificial electrode to the electrode and prevent ions from migrating from the workpiece to the electrode.

24. A method of forming a hole with an electric spark, comprising:

creating an arc at a gap between an electrode and a workpiece;

supplying a liquid to the gap;

applying a voltage, in the range of approximately equal to an arcing voltage to twice the arcing voltage, to said electrode; and controlling at least one of the voltage, a conductivity of the liquid, and a size of the gap to maintain a condition within said gap in an arcing condition to create a desired hole in the workpiece positioning a guide member such that when the electrode vibrates while penetrating through the workpiece, the electrode touches the guide member to complete a circuit and generates a detachable signal, and detecting the signal and stopping the electrode in response to the signal.

25. A method of forming a hole with an electric spark, comprising:

creating an arc at a gap between an electrode and a workpiece;

supplying a liquid to the gap;

applying a voltage, in the range of approximately equal to an arcing voltage to twice the arcing voltage, to said electrode; and controlling at least one of the voltage, a conductivity of the liquid, and a size of the gap to maintain a condition within said gap in an arcing condition to create a desired hole in the workpiece; wherein said controlling by advancing, maintaining or reversing the electrode is performed in response to a control pulse produced by a pulse generator, which is generated during an end of an off-time of a switching element.

26. The method of claim 25, wherein the liquid is a low resistivity liquid.

27. The method of claim 25, wherein the liquid has a resistivity of 6,000–10,000 cmΩ.

28. A method of forming a hole with an electric spark, comprising:

creating an arc at a gap between an electrode and a workpiece;

supplying a liquid to the gap;

applying a voltage, in the range of approximately equal to an arcing voltage to twice the arcing voltage, to said electrode; and controlling at least one of the voltage, a conductivity of the liquid, and a size of the gap to maintain a condition within said gap in an arcing condition to create a desired hole in the workpiece; wherein said controlling includes controlling the voltage applied to the electrode based on the conductivity of the liquid.

* * * * *